(12) United States Patent
Lee et al.

(10) Patent No.: US 8,431,636 B2
(45) Date of Patent: Apr. 30, 2013

(54) POLYAMIDE RESIN COMPOSITION

(75) Inventors: Sang Hwa Lee, Uiwang-si (KR); In Sik Shim, Uiwang-si (KR); In Geol Baek, Uiwang-si (KR); Pil Ho Kim, Uiwang-si (KR); Jong Cheol Lim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/338,350

(22) Filed: Dec. 28, 2011

(65) Prior Publication Data

US 2012/0165445 A1    Jun. 28, 2012

(30) Foreign Application Priority Data

Dec. 28, 2010  (KR) .................. 10-2010-0136324
Dec. 26, 2011  (KR) .................. 10-2011-0142044

(51) Int. Cl.
*C08K 5/17* (2006.01)
*C08K 3/22* (2006.01)
*C08K 3/30* (2006.01)
*C08K 3/26* (2006.01)

(52) U.S. Cl.
USPC ........... 524/186; 524/413; 524/420; 524/437; 524/606

(58) Field of Classification Search .................. 524/186, 524/413, 420, 437, 606
See application file for complete search history.

(56) References Cited

FOREIGN PATENT DOCUMENTS

| EP | 696304 | * | 4/1994 |
|---|---|---|---|
| JP | 1995-228776 | | 8/1995 |
| JP | 2002-294070 | | 10/2002 |
| JP | 2004-075994 | | 3/2004 |
| JP | 2007-218980 | * | 8/2007 |
| WO | 03-085029 A1 | | 10/2003 |

OTHER PUBLICATIONS

Machine translation of JP 2007-218980. Aug. 2007.*

* cited by examiner

*Primary Examiner* — John Uselding
(74) *Attorney, Agent, or Firm* — Summa, Additon & Ashe, P.A.

(57) ABSTRACT

A polyamide resin composition according to the present invention comprises (A) crystalline polyamide resin having a glass transition temperature (Tg) of about 50 to about 100° C.; (B) crystalline polyamide resin having a glass transition temperature (Tg) of about 110 to about 160° C.; (C) inorganic filler; (D) white pigment; and (E) light stabilizer, and can have excellent surface gloss, surface reflectance, heat resistance, mechanical strength, moldability, light stability and discoloration resistance.

12 Claims, No Drawings

POLYAMIDE RESIN COMPOSITION

CROSS-REFERENCE TO RELATED APPLICATION

This application claims priority under 35 USC Section 119 to and the benefit of Korea Patent Application No. 10-2010-0136324, filed on Dec. 28, 2010, and Korea Patent Application No. 2011-0142044, filed on Dec. 26, 2011, in the Korean Intellectual Property Office, the disclosure of each of which is incorporated herein by reference in its entirety.

FIELD OF THE INVENTION

The present invention relates to a polyamide resin composition.

BACKGROUND OF THE INVENTION

Reflectors are used in various products in order to use light more effectively. Recently, many products include a light source in the form of a semiconductor, i.e. semiconductor laser, light emitting diode (hereinafter, LED), and the like, to allow miniaturization of the device and light source. Reflectors for LEDs and resin compositions for the preparation thereof can require properties such as high light reflectance, high whiteness, good moldability, high dimensional stability, high mechanical strength, high heat resistance and the like.

For example, reflectors used for LEDs can require not only mechanical strength but also heat resistance because the reflectors are surface mounted onto, for example, a printed circuit board. Reflectors for LEDs can also require excellent moldability due to the miniaturization of the device. Also, reflectors can require high surface reflectance, and in particular the ability to inhibit the degradation of surface reflectance due to exposure to heat during the process of assembling the LED and the process of reflow soldering. Also, reflectors can be made using a particular insert molding method to obtain a reflector with high surface reflectance, and accordingly a resin composition which can be used in such a method can also be required.

Conventionally, liquid crystal polymers (LCPs) or heat-resistant polyamide resins were used as materials able to resist temperatures during reflow soldering using lead-free solder (typically 260° C.). LCP has excellent in heat resistance, light stability and moldability. However, adhesion of the LCP with a sealing resin such as epoxy resin, which is used after mounting the LED to the reflector, can deteriorate. Also, LCPs can have low whiteness and thus it can be difficult to provide high surface reflectance thereto.

Aliphatic polyamides (such as PA6, PA66, PA11, and PA12) can have excellent mechanical strength properties and injection moldability. Aliphatic polyamide resins, however, do not have heat resistance sufficient to resist temperatures during reflow soldering and further cannot have low hygroscopicity. Also aliphatic polyamides can suffer deteriorated surface reflectance due to discoloration that can occur during heating.

International Patent Application Publication No. 2003-085029 and Japanese Patent Application Publication No. 1995-228776 are directed to a resin composition for reflectors comprising polyamide resin consisting of 1,9-diaminononane and inorganic filler. However, the resin composition does not adhere well to a sealing resin.

Japanese Patent Application Publication No. 2002-294070 is directed to a polyamide resin including potassium titanate fiber and/or wollastonite. However, the resin does not have sufficient strength when molding, and it can be difficult to use when insert molding.

Japanese Patent Application Publication No. 2004-075994 is directed to a polyamide composition useful for articles and lamp reflector materials with high whiteness and high surface reflectance. The polyamide composition has higher heat resistance than a resin composition using a conventional heat-resistant polyamide such as PA6T or PA46 and the like, but it does not completely solve the discoloration problem resulting from exposure to heat.

SUMMARY OF THE INVENTION

The present invention relates to a polyamide resin composition that can have excellent surface gloss and surface reflectance. A polyamide resin composition according to the present invention comprises (A) crystalline polyamide resin having a glass transition temperature (Tg) of about 50 to about 100° C.; (B) crystalline polyamide resin having a glass transition temperature (Tg) of about 110 to about 160° C.; (C) inorganic filler; (D) white pigment, and (E) a light stabilizer. A molded article formed of the polyamide resin composition can have a 60° surface gloss of more than about 85% and a surface reflectance of about 70 to about 100% at a 440 nm wavelength light, which is measured after the molded article is illuminated by a LED light source having a wavelength of 460 nm for 120 hours, and a yellow index of less than about 10, which is measured after the molded article is illuminated by a LED light source having a wavelength of 460 nm for 120 hours in a constant temperature and humidity environment at a temperature of 85° C. and a relative humidity of 85%.

A polyamide resin composition according to the present invention comprises (A) about 10 to about 70% by weight of a crystalline polyamide resin; (B) about 10 to about 70% by weight of a crystalline polyamide resin; (C) about 10 to about 60% by weight of inorganic filler; (D) about 10 to about 50% by weight of white pigment, and (E) about 0.05 to about 2 parts by weight of light stabilizer, based on about 100 parts by weight of the crystalline polyamide resin (A), the crystalline polyamide resin (B), the inorganic filler (C) and the white pigment (D).

A molded article according to the present invention is prepared from the polyamide resin composition.

DETAILED DESCRIPTION OF THE INVENTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Crystalline Polyamide Resin Having a Glass Transition Temperature (Tg) of About 50° C. to About 100° C.

The crystalline polyamide resin (A) comprises (a-1) units derived from dicarboxylic acid and (a-2) units derived from diamine. The polyamide resin (A) of the present invention can be prepared by polymerizing dicarboxylic acid and diamine. The polyamide resin (A) can have a glass transition temperature of about 50° C. to about 100° C. measured by differential scanning calorimeter (DSC). The crystalline polyamide resin (A) can have a crystallinity of about 30% or more, for example about 30% to about 40%. Crystalline polyamide resins with a Tg as defined herein can be made without undue experimentation by one of ordinary skill in the art and are also commercially available.

(a-1) Units Derived from Dicarboxylic Acid

The term "units derived from dicarboxylic acid" refers to residues of dicarboxylic acid from which hydroxyl groups positioned at both ends of the dicarboxylic acid are removed. The units derived from dicarboxylic acid (a-1) of the present invention may include about 30 to about 100 mol % terephthalic acid, about 0 to about 70 mol % aromatic dicarboxylic acid units other than terephthalic acid, and/or 0 to about 70 mol % aliphatic dicarboxylic acid units (a1).

In some embodiments, the units derived from dicarboxylic acid (a-1) may include units derived from terephthalic acid in an amount of about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 mol %. Further, according to some embodiments of the present invention, the amount of units derived from terephthalic acid can be in a range from about any of the foregoing amounts to about any other of the foregoing amounts.

In some embodiments, the units derived from dicarboxylic acid (a-1) may include units derived from an aromatic dicarboxylic acid other than terephthalic acid in an amount of zero (the units derived from an aromatic dicarboxylic acid other than terephthalic acid are not present), or about 0 (the units derived from an aromatic dicarboxylic acid other than terephthalic acid are present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 mol %. Further, according to some embodiments of the present invention, the amount of units derived from an aromatic dicarboxylic acid other than terephthalic acid can be in a range from about any of the foregoing amounts to about any other of the foregoing amounts.

In some embodiments, the units derived from dicarboxylic acid (a-1) may include units derived from an aliphatic dicarboxylic acid (a1) in an amount of zero (the units derived from aliphatic dicarboxylic acid (a1) are not present), or about 0 (the units derived from aliphatic dicarboxylic acid (a1) are present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 mol %. Further, according to some embodiments of the present invention, the amount of units derived from aliphatic dicarboxylic acid (a1) can be in a range from about any of the foregoing amounts to about any other of the foregoing amounts.

Examples of the aromatic dicarboxylic acid other than terephthalic acid may comprise without limitation isophthalic acid, 2-methylterephtalic acid, naphthalenedicarboxylic acid, and the like, and combinations thereof.

The number of carbon atoms of the aliphatic dicarboxylic acid is not limited specifically, and can be 4 to 20, for example 6 to 12. Examples of the aliphatic dicarboxylic acid comprise without limitation adipic acid, suberic acid, azelaic acid, sebacic acid, decane dicarboxylic acid, undecane dicarboxylic acid, dodecane dicarboxylic acid and the like, and combinations thereof. In exemplary embodiments, adipic acid can be used.

In an exemplary embodiment of the present invention, the units derived from dicarboxylic acid (a-1) comprise units derived from terephthalic acid in an amount of about 30 to about 100 mol %, for example about 40 to about 100 mol %, and as another example about 40 to about 80 mol %, based on about 100 mol % of units derived from dicarboxylic acid (a-1).

In another exemplary embodiment of the present invention, the units derived from dicarboxylic acid (a-1) comprise units derived from aromatic dicarboxylic acid other than terephthalic acid in an amount of about 0 to about 70 mol %, for example about 0 to about 60 mol %, and as another example about 20 to about 60 mol %, based on about 100 mol % of units derived from dicarboxylic acid (a-1).

In another exemplary embodiment of the present invention, the units derived from dicarboxylic acid (a-1) comprise units derived from aliphatic dicarboxylic acid having 4 to 20 carbon atoms, for example 6 to 12 carbon atoms, in an amount of about 0 to about 70 mol %, for example about 0 to about 60 mol %, and as another example about 20 to about 60 mol %, based on about 100 mol % of units derived from dicarboxylic acid (a-1).

In exemplary embodiments of the present invention, the units derived from dicarboxylic acid (a-1) may comprise a small amount, for example about 10 mol % or less, of units derived from polycarboxylic acid having 3 or more carboxyl groups. Examples of the polycarboxylic acid having 3 or more carboxyl groups comprise without limitation trimellitic acid, pyromellitic acid and the like, and combinations thereof.

(a-2) Units Derived from Diamine

The term "units derived from diamine" refers to residues of diamine from which hydrogens positioned at both ends of the diamine are removed. Examples of diamines comprise include without limitation linear and/or branched aliphatic diamines having 4 to 20 carbon atoms, for example 6 to 12 carbon atoms.

Examples of the linear aliphatic diamine comprise without limitation 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane and the like. These can be used alone or in combination thereof.

In an exemplary embodiment of the present invention, the units derived from diamine comprise units derived from 1,6-diaminohexane in an amount of about 50 to about 100 mol %.

In some embodiments, the units derived from diamine comprise units derived from 1,6-diaminohexane in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 mol %. Further, according to some embodiments of the present invention, the amount of units derived from 1,6-diaminohexane can be in a range from about any of the foregoing amounts to about any other of the foregoing amounts.

Examples of the branched aliphatic diamine comprise without limitation 2-methyl-1,5-diaminopentane, 2-methyl-1,6-diaminohexane, 2-methyl-1,7-diaminoheptane, 2-methyl-1,8-diaminooctane, 2-methyl-1,9-diaminononane, 2-methyl-1,10-diaminodecane, 2-methyl-1,11-diaminoundecane and the like. These can be used alone or in combination thereof. In exemplary embodiments, 2-methyl-1,5-diaminopentane, 2-methyl-1,7-diaminoheptane, 2-methyl-1,8-diaminooctane and/or 2-methyl-1,9-diaminononane may be used.

The crystalline polyamide resin (A) can be prepared by known methods, and can be prepared by polycondensation of dicarboxylic acid component and diamine component. For example, as disclosed in International Patent Application Publication No. 2003-085029, the crystalline polyamide resin can be prepared by heating dicarboxylic acid component and diamine component in the presence of a catalyst to obtain a prepolymer, and polycondensing the prepolymer by imparting shearing stress to molten material of the prepolymer.

In exemplary embodiments of the present invention, the crystalline polyamide resin (A) can have an intrinsic viscosity [η] of about 0.3 to about 0.9 dl/g, for example about 0.5 to about 0.9 dl/g, and as another example about 0.6 to about 0.9 dl/g measured in 96.5% sulfuric acid solution at 25° C. When the intrinsic viscosity of the crystalline polyamide resin is within the above range, excellent flowability during molding can be maintained.

In exemplary embodiments of the present invention, the crystalline polyamide resin (A) can have a melting point of about 260 to about 350° C., for example about 290 to about 335° C. measured by differential scanning calorimeter (DSC). In exemplary embodiments of the present invention, the crystalline polyamide resin (A) can have a glass transition temperature of about 50 to about 100° C. measured by differential scanning calorimeter (DSC). When the melting point and the glass transition temperature of the crystalline polyamide resin (A) are within the above range, the polyamide resin composition can have excellent heat resistance.

The polyamide resin composition can include the crystalline polyamide resin (A) in an amount of about 10 to about 70% by weight, for example about 10 to about 50% by weight, and as another example about 20 to about 40% by weight, based on about 100% by weight of the crystalline polyamide resin (A), the crystalline polyamide resin (B), the inorganic filler (C) and the white pigment (D). In some embodiments, polyamide resin composition can include the crystalline polyamide resin (A) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70% by weight. Further, according to some embodiments of the present invention, the amount of crystalline polyamide resin (A) can be in a range from about any of the foregoing amounts to about any other of the foregoing amounts.

(B) Crystalline Polyamide Resin Having a Glass Transition Temperature (Tg) of About 110 to About 160° C.

The crystalline polyamide resin (B) can be prepared using similar monomers used in the preparation of the crystalline polyamide resin (A). The crystalline polyamide resin (B) can have a crystallinity of about 30% or more, for example about 30% to about 40%. Crystalline polyamide resins with a Tg as defined herein can be made without undue experimentation by one of ordinary skill in the art and are also commercially available.

The glass transition temperature (Tg) of crystalline polyamide resin (B), however, is different from the Tg of the crystalline polyamide resin (A).

In an exemplary embodiment of the present invention, the crystalline polyamide resin (B) can have a glass transition temperature of about 110 to about 160° C., for example about 120 to about 160° C. measured by differential scanning calorimeter (DSC).

If the glass transition of the crystalline polyamide resin (B) is outside of the above range, delamination property can deteriorate when the resin composition of the present invention is used in an injection molding process.

The polyamide resin composition can include the crystalline polyamide resin (B) in an amount of about 10 to about 70% by weight, for example about 10 to about 50% by weight, and as another example about 20 to about 40% by weight, based on about 100% by weight of the crystalline polyamide resin (A), the crystalline polyamide resin (B), the inorganic filler (C) and the white pigment (D). In some embodiments, polyamide resin composition can include the crystalline polyamide resin (B) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70% by weight. Further, according to some embodiments of the present invention, the amount of crystalline polyamide resin (B) can be in a range from about any of the foregoing amounts to about any other of the foregoing amounts.

(C) Inorganic Filler

The mechanical strength of the polyamide resin composition can be improved by adding inorganic filler (C) into the blend of the crystalline polyamide resin (A) and the crystalline polyamide resin (B). Inorganic fillers having a variety of shapes, such as but not limited to fibers, powders, granules, plates, needles, cloths, mats and the like and combinations thereof can be used. Examples of the inorganic filler can include without limitation inorganic fibers such as glass fibers, metal-coated glass fibers, ceramic fibers, carbon fibers, metal carbide fibers, metal-cured material fibers, asbestos fibers, boron fibers and the like, and combinations thereof.

In exemplary embodiments of the present invention, glass fiber can be used as inorganic filler. Using glass fiber can help improve moldability of the polyamide resin composition. Also, mechanical properties such as tensile strength, flexural strength, flexural modulus and the like and heat-resistant properties such as heat distortion temperature and the like of the molded article prepared from the resin composition can be improved.

In exemplary embodiments of the present invention, the glass fiber can have an average length of about 0.1 to about 20 mm, for example about 0.3 to about 6 mm, and an aspect ratio (L (average length of fiber)/D (average external diameter of fiber)) of about 10 to about 2,000, for example about 30 to about 600.

The polyamide resin composition can include the inorganic filler (C) in an amount of about 10 to about 60% by weight, for example about 10 to about 40% by weight, and as another example about 10 to about 25% by weight, based on about 100% by weight of the crystalline polyamide resin (A), the crystalline polyamide resin (B), the inorganic filler (C) and the white pigment (D). In some embodiments, polyamide resin composition can include the inorganic filler (C) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60% by weight. Further, according to some embodiments of the present invention, the amount of inorganic filler (C) can be in a range from about any of the foregoing amounts to about any other of the foregoing amounts.

(D) White Pigment

Examples of the white pigment (D) comprise without limitation titanium oxide, zinc sulfide, white lead, zinc sulfate, aluminum oxide and the like. These can be used alone or in combination thereof.

White pigment treated with silane coupling agent, titanium coupling agent and the like can also be used. For example, white pigment surface-treated with a silane-based compound such as vinyltriethoxysilane, 2-aminopropyltriethoxysilane, 2-glycidoxypropyltriethoxysilane and the like can be used.

In exemplary embodiments of the present invention, the white pigment can be titanium oxide. Optical properties such as surface reflectance, concealment property and the like can be improved by using the titanium oxide. In exemplary embodiments of the present invention, the titanium oxide can have a standard shape. The average particle diameter of the titanium oxide can be about 0.05 to about 2.0 μm, for example about 0.05 to about 0.7 μm.

The polyamide resin compositions can include the white pigment (D) in an amount of about 10 to about 50% by weight, for example about 20 to about 40% by weight, and as another example about 25 to about 30% by weight, based on 100% by weight of the crystalline polyamide resin (A), the crystalline polyamide resin (B), the inorganic filler (C) and the white pigment (D). In some embodiments, the polyamide resin composition can include the white pigment (D) in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the white pigment (D) can be in a range from about any of the foregoing amounts to about any other of the foregoing amounts.

(E) Light Stabilizer

The polyamide resin composition according to the present invention may further comprise a light stabilizer to prevent discoloration and inhibit degradation of light reflectance. Examples of the light stabilizer comprise without limitation compounds able to absorb UV such as benzophenone-based compounds, salicylate-based compounds, benzotriazole-based compounds, acrylonitrile-based compounds, other resonance-based compounds and the like; compounds able to capture radicals such as hindered amine-based compounds, hindered phenol-based compounds and the like; and combinations thereof.

In exemplary embodiments of the present invention, a compound that has high solubility in a mixture of the crystalline polyamide resin (A) and the crystalline polyamide resin (B), excellent heat resistance, and amide bonds in the molecule can be used. Also, using both a compound able to absorb UV and a compound able to capture radicals can improve light stability.

Depending on the effect of preventing discoloration and inhibiting degradation of light reflectance of the polyamide resin composition, the polyamide resin composition can include the light stabilizer (E) in an amount of about 0.05 to about 2 parts by weight, for example about 0.1 to about 2 parts by weight, based on about 100 parts by weight of the crystalline polyamide resin (A), the crystalline polyamide resin (B), the inorganic filler (C) and the white pigment (D). In some embodiments, the polyamide resin composition can include the light stabilizer (E) in an amount of about 0.05, 0.06, 0.07, 0.08, 0.09, 0.1, 0.2, 0.3, 0.4, 0.5, 0.6, 0.7, 0.8, 0.9, 1, or 2 parts by weight. Further, according to some embodiments of the present invention, the amount of the light stabilizer (E) can be in a range from about any of the foregoing amounts to about any other of the foregoing amounts.

(F) Additives

The polyamide resin composition according to the present invention can further comprise one or more additives such as but not limited to an antioxidant, heat stabilizer, flame retardant, fluorescent whitening agent, plasticizer, thickener, antistatic agent, releasing agent, pigment, nucleating agent and the like, and combinations thereof, depending on the use of the composition, so long as the additives have minimal negative impact on the properties of the composition. Examples of the antioxidant comprise without limitation phenol-based compounds, amine-based compounds, sulfur-based compounds, phosphorus-based compounds and the like, and combinations thereof. Examples of the heat stabilizer comprise without limitation lactone compounds, hydroquinone-based compounds, halogenated copper, iodine compounds and the like, and combinations thereof. Examples of the flame retardant comprise without limitation bromine-based compounds, chlorine-based compounds, phosphorus-based compounds, antimony-based compounds, inorganic compounds and the like and combinations thereof.

Also, the polyamide resin composition according to the present invention can further comprise an olefin-based copolymer or modified olefin-based copolymer such as but not limited to ethylene-methylacrylate copolymer, ethylene-ethylacrylate copolymer, ethylene-propylene copolymer, ethylene-1-butene copolymer, propylene-1-butene copolymer and the like; other polymers such as but not limited to polystyrene, fluorine resin, silicone resin, liquid crystal polymer and the like, and combinations thereof, depending on the use of the composition, so long as the copolymers have minimal negative impact on the properties of the composition.

The polyamide resin composition according to the present invention can be prepared by known methods, for example by mixing all components by means of henschel mixer, V blender, ribbon blender, tumbler blender and the like, or after mixing further melting-mixing the mixture by means of single-screw extruder, multi-screw extruder, kneader, banbury mixer and the like. The composition can be extruded in the form of pellets (which can be pulverized) or can be directly extruded into a molded article.

The polyamide resin composition according to the present invention can have excellent light reflectance, heat resistance, and adhesion with a sealing resin such as epoxy resin, and when the polyamide resin composition is used as a reflector of a LED, degradation of surface reflectance can be inhibited.

The present invention provides a molded article prepared from the polyamide resin composition. For example, the polyamide resin composition according to the present invention can be prepared into a reflector for a LED by heat molding such as injection molding (insert molding of metal such as hoop molding), melt molding, extrusion molding, inflation molding, blow molding and the like. Also, the reflector for a LED prepared from the polyamide resin composition according to the present invention along with common LED elements and other parts can be sealed, connected or bonded by sealing resin.

The polyamide resin composition and the molded article prepared from the same according to the present invention can be used in other products reflecting light. For example, a reflector prepared from the polyamide resin composition according to the present invention can be used as a reflector for light-emitting devices of various electrical or electronic parts, interior lighting, ceiling lighting, outside lighting, automobile lighting, display units, head lights and the like. The polyamide resin composition according to the present invention can be molded into a reflector by known methods, for example heating and melting the polyamide resin composition, molding using a desired mold, and cooling. Also, the polyamide resin composition can be molded into a reflector by known methods, for example injection molding, compression molding, extrusion molding and the like.

In exemplary embodiments of the present invention, the molded article can have a 60° surface gloss of more than about 85%.

In exemplary embodiments of the present invention, the molded article can have a surface reflectance of about 70 to about 100% at a 440 nm wavelength light, for example about 80 to about 90%, and as another example about 85 to about 90%, which is measured after the molded article is illuminated by a LED light source having a wavelength of 460 nm for 120 hours in a constant temperature and humidity environment at a temperature of 85° C. and a relative humidity of 85%.

In exemplary embodiments of the present invention, the molded article can have a yellow index of less than about 10, for example less than about 5, and as another example less than about 4, which is measured after the molded article is illuminated by a LED light source having a wavelength of 440 nm for 120 hours in a constant temperature and humidity environment at a temperature of 85° C. and a relative humidity of 85%.

The invention may be better understood by reference to the following examples which are intended for the purpose of illustration and are not to be construed as in any way limiting the scope of the present invention, which is defined in the claims appended hereto.

EXAMPLES

The specifications of each component used in the following examples and comparative examples are as follows.

(A) Crystalline Polyamide Resin

C3200 made by Mitsui Chemical Company (Japan) and having a melting point of 320° C. measured by DSC, a glass transition temperature of 90° C. measured by DSC, and having an intrinsic viscosity [η] of 0.6 dl/g is used.

(B-1) Crystalline Polyamide Resin

HTN501 made by Dupont Company (USA) and having a melting point of 300° C. measured by DSC, a glass transition temperature of 138° C. measured by DSC is used.

(B-2) Crystalline Polyamide Resin

A crystalline polyamide resin (B-2) having a melting point of 240° C. measured by DSC, a glass transition temperature of 170° C. measured by DSC is used.

(C) Inorganic Filler

CS 910 made by OCV reinforcements Company (USA) is used.

(D) White Pigment $TiO_2$ 2233 made by KRONOS Company (USA) is used.

(E) Light Stabilizer

CHIMASSORB944 made by BASF Company (Germany) is used.

Examples 1 to 3 and Comparative Examples 1 to 4

In a conventional mixer each component, antioxidant, heat stabilizer and releasing agent are added and mixed. The mixture is extruded by a twin screw extruder with L/D of 35 and diameter of 45 mm at 250 to 350° C. to prepare pellets. The pellets are prepared into specimens in the form of a plate (length: 90 mm, width: 49 mm, thickness: 2.5 mm) by a 10 oz injection molding machine at an injection temperature of 320 to 340° C. The specimen is left in at the conditions of a temperature of 23° C. and relative humidity of 50% for 48 hours, and then the properties of the specimens are measured in accordance with the following methods. The results are presented in Table 1.

Methods for Measuring Properties

[Melting Point]

Using a DSC7 made by PerkinElmer Company, the temperature is maintained at 330° C. for 5 minutes, the temperature is decreased to 23° C. at a rate of 10° C./min and the temperature is increased at a rate of 10° C./min. Heat absorption peak when dissolved is determined as the melting point.

[Glass Transition Temperature]

Using a DSC7 made by PerkinElmer Company, the temperature is maintained at 330° C. for 5 minutes, the temperature is decreased to 23° C. at a rate of 10° C./min and the temperature is increased at a rate of 10° C./min. Second-order endothermic transition point is determined as the glass transition temperature.

[Reflectance]

Using the specimen in the form of a plate, the surface reflectance at a 440 nm wavelength light is measured. The initial surface reflectance is measured, and the surface reflectance is measured after the specimen is illuminated by a LED light source having a wavelength of 460 nm for 120 hours in a constant temperature and humidity environment, and in particular an oven at a temperature of 85° C. and relative humidity of 85%. A CM3500d made by KONICA MINOLTA HOLDINGS, INC. is the instrument used to measure reflectance.

[Yellow Index]

Yellow index of a specimen with a thickness of 2.5 mm is measured in accordance with ASTM D1925 using a colorimeter Minolta Spectrophotometer 3600D using the CIE Lab color difference evaluation criteria. The initial yellow index is measured, and the yellow index is measured after the specimen is illuminated by a LED light source having a wavelength of 460 nm for 120 hours in a constant temperature and humidity environment, and in particular an oven, at a temperature of 85° C. and relative humidity of 85%.

[Gloss]

Surface gloss of a specimen with a thickness of 2.5 mm is measured at 60° angle by UGV-6P of SUGA corp.

[Evaluation of Delamination Property]

Evaluation of delamination (release) property is conducted to determine whether or not the release property of the composition is poor when injection-molding the polyamide resin composition or to determine if a delamination phenomenon appears due to the blend with a different kind of resin. An article with a length of 3 mm, width of 2.5 mm and height of 2 mm in the form of a cup is prepared by hoop molding. Aqueous ink is dropped into the contact area of hoop material and the article in the form of cup. Whether or not the aqueous ink permeates into the contact surface of the hoop material and the article in the form of cup due to the capillary phenomenon is evaluated with the naked eye. The initial delamination property is evaluated, and the delamination property is evaluated after the hoop material and the article are left in a constant temperature environment, and in particular an oven, at a temperature of 170° C. for 3 hours.

TABLE 1

|  | Examples | | | Comparative Examples | | | |
| --- | --- | --- | --- | --- | --- | --- | --- |
|  | 1 | 2 | 3 | 1 | 2 | 3 | 4 |
| (A) Crystalline Polyamide (wt %) Tg: 90° C. | 30 | 40 | 20 | 60 | — | 40 | 40 |

TABLE 1-continued

|  |  | Examples | | | Comparative Examples | | | |
| --- | --- | --- | --- | --- | --- | --- | --- | --- |
|  |  | 1 | 2 | 3 | 1 | 2 | 3 | 4 |
| (B-1) Crystalline Polyamide (wt %) Tg: 138° C. | | 30 | 20 | 40 | — | 60 | 20 | — |
| (B-2) Crystalline Polyamide (wt %) Tg: 170° C. | | — | — | — | — | — | — | 20 |
| (C) Inorganic Filler (wt %) | | 15 | 15 | 10 | 15 | 20 | 15 | 15 |
| (D) White Pigment (wt %) | | 25 | 25 | 30 | 25 | 20 | 25 | 25 |
| (E) Light Stabilizer (parts by weight) | | 0.5 | 0.3 | 0.6 | 0.3 | 0.5 | — | 0.5 |
| Gloss (%) | | 96.2 | 94.5 | 93.2 | 30.1 | 53.8 | 93.1 | 65.4 |
| Reflectance (%) | Initial | 90 | 90 | 89 | 88 | 85 | 89 | 87 |
|  | After 120 hours | 88 | 87 | 87 | 75 | 72 | 52 | 75 |
| Evaluation of Delamination Property | Initial | ○ | ○ | ○ | ○ | Δ | ○ | Δ |
|  | 170° C., After 3 hours | ○ | ○ | ○ | X | X | ○ | X |
| Yellow Index | Initial | 2.3 | 2.4 | 2.4 | 4.8 | 3.1 | 5.0 | 5.2 |
|  | After 120 hours | 3.2 | 3.5 | 3.9 | 5.7 | 4.8 | 30.8 | 10.4 |

○: no permeation, Δ: small amount permeation, X: large amount permeation

As shown in Table 1, Examples 1 to 3 using the two different crystalline polyamides (A) and (B-1) exhibit excellent surface gloss. In contrast, the surface gloss of Comparative Example 1 including polyamide (A) alone and Comparative Example 2 including polyamide (B-1) alone excessively deteriorates.

Further, even when the composition includes polyamide (A) and polyamide (B-2) as in Comparative Example 4, surface gloss is much lower than about 85% and delamination property deteriorates after evaluating the article left at a constant temperature of 170° C. for 3 hours, and yellow index also excessively deteriorates after the specimen is illuminated by a LED light source having a wavelength of 460 nm for 120 hours under constant temperature and humidity conditions of a temperature of 85° C. and relative humidity of 85%.

With respect to the evaluation of delamination property, Examples 1 to 3 exhibit no permeation after evaluating the article left at a constant temperature of 170° C. for 3 hours. In contrast, Comparative Example 1 including polyamide (A) alone, Comparative Example 2 including polyamide (B-1) alone, and Comparative Example 4 including both polyamide (A) and polyamide (B-2) exhibit a large amount of permeation of aqueous ink.

Also, the surface gloss of Comparative Example 3 not including light stabilizer is much lower than about 85% and the yellow index of Comparative Example 3 excessively deteriorates after the specimen is illuminated by a LED light source having a wavelength of 460 nm for 120 hours under constant temperature and humidity conditions of a temperature of 85° C. and relative humidity of 85%.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polyamide resin composition for a reflector comprising:
   (A) crystalline polyamide resin having a glass transition temperature (Tg) of about 50 to about 100° C.;
   (B) crystalline polyamide resin having a glass transition temperature (Tg) of about 110 to about 160° C.;
   (C) inorganic filler;
   (D) white pigment; and
   (E) light stabilizer;
   wherein a molded article formed of the polyamide resin composition has a 60° surface gloss of more than about 85% and a surface reflectance of about 70 to about 100% at a 440 nm wavelength light measured after the molded article is illuminated by a LED light source having a wavelength of 460 nm for 120 hours in a constant temperature and humidity environment of 85° C. and 85% relative humidity.

2. The polyamide resin composition for a reflector of claim 1, wherein the molded article formed of the polyamide resin composition has a yellow index of less than about 10, measured after illuminated of the molded article by a LED light source having a wavelength of 460 nm for 120 hours in a constant temperature and humidity environment of 85° C. and 85% relative humidity.

3. The polyamide resin composition for a reflector of claim 1, wherein the crystalline polyamide resin (B) has a glass transition temperature (Tg) of about 120 to about 160° C.

4. The polyamide resin composition for a reflector of claim 1, wherein the inorganic filler (C) comprises a glass fiber having an average length of about 0.1 to about 20 mm and an aspect ratio of about 10 to about 2,000.

5. The polyamide resin composition for a reflector of claim 1, wherein the white pigment (D) comprises titanium oxide, zinc sulfide, white lead, zinc sulfate, aluminum oxide or a combination thereof.

6. The polyamide resin composition for a reflector of claim 1, wherein the light stabilizer (E) comprises a hindered amine-based compound.

7. The polyamide resin composition for a reflector of claim 1 comprising;
   (A) about 10 to about 70% by weight of the crystalline polyamide resin having a glass transition temperature (Tg) of about 50 to about 100° C.;
   (B) about 10 to about 70% by weight of the crystalline polyamide resin (B) having a glass transition temperature (Tg) of about 110 to about 160° C.;
   (C) about 10 to about 60% by weight of the inorganic filler;
   (D) about 10 to about 50% by weight of the white pigment, and (E) about 0.05 to about 2 parts by weight of the light stabilizer, based on about 100 parts by weight of the crystalline polyamide resin (A), the crystalline polyamide resin (B), the inorganic filler (C) and the white pigment (D).

8. A molded article prepared from the polyamide resin composition for a reflector of claim 1.

9. The polyamide resin composition for a reflector of claim 7, comprising:
   (A) about 20 to about 40% by weight of the crystalline polyamide resin having a glass transition temperature (Tg) of about 50 to about 100° C.; and
   (B) about 20 to about 40% by weight of the crystalline polyamide resin having a glass transition temperature (Tg) of about 110 to about 160° C.

10. The polyamide resin composition for a reflector of claim 1, wherein the crystalline polyamide resin (A) has a glass transition temperature (Tg) of 90 to about 100° C.

11. The polyamide resin composition for a reflector of claim 10, wherein the crystalline polyamide resin (B) has a glass transition temperature (Tg) of 138 to about 160° C.

12. The polyamide resin composition for a reflector of claim 11, comprising:
   about 20 to about 40% by weight of the crystalline polyamide resin (A); and
   about 20 to about 40% by weight of the crystalline polyamide resin (B).

* * * * *